Patented July 15, 1930

1,770,867

UNITED STATES PATENT OFFICE

BERT STANSEL, OF GUEYDAN, LOUISIANA

METHOD OF RAISING RICE

No Drawing.   Application filed August 2, 1929. Serial No. 383,175.

This invention relates to a new and improved method of growing rice, by means of which rice may be grown on land heretofore unsuited for the purpose.

Another object of the invention is to provide a method for growing rice which is simple, economical and efficient in use, and by means of which a relatively large crop of rice of excellent quality may be produced.

Another object of the invention is the provision of a method of growing rice in which the plant is initially rooted in water, rendering it unnecessary to subject the plant to change from a ground plant to a water plant, (as in the method where the rice is initially planted in the soil) so that the plant will mature faster and produce a larger and better crop of rice per acre.

Another object of the invention is the provision of a method of growing rice which will eliminate weeds and other foreign vegetation, as well as to destroy bugs and insects injurious to the growth of the plant.

In carrying out the process, the land is prepared in the manner usual for a rice crop. The seed may be sown upon the top of the dry ground and the ground afterward flooded, or the water may be put on the ground and the seed sown in the water. The seed rests on top of the ground and is not covered with soil.

Oil is then applied to the water until a film of oil is formed over the entire field. This oil film destroys the water bugs which attack the rice sprouts, killing the bugs when they come up for air. As the seeds are under water when the oil is applied, the oil does not come in contact with or injure the seeds. The seeds first sprout and then send out their roots, the sprouting and rooting season covering a period of eight or nine days. When the roots can be seen, the water is turned off. This turning off of the water is accomplished by opening the levees and draining the water from the field. Crude oil is used and is added each day during the sprouting and rooting period, but not in sufficient quantities to injure the plants, as would scum. The oil does not remain long enough to suffocate the plants. Approximately one gallon of oil is used for each acre.

Owing to the rice having been sprouted and rooted in the water, it is unnecessary to change the rice from a ground plant to a water plant so that a steady and rapid growth is maintained. In addition, the sprouting and rooting of the rice in water provides several days start on grass, weeds and other vegetation. As soon as the grass and weed seed begin to sprout after the water is turned off, the field is again flooded. The rice is large enough by this time to grow well, but the sprouting grass and weed seed are destroyed.

The invention is susceptible of various changes in its form, proportions and minor details of construction and the right is herein reserved to make such changes as properly fall within the scope of the appended claims.

Having described the invention what is claimed is:—

1. The herein described method of growing rice consisting of flooding the rice field with water and oil until the rice has sprouted and rooted, and then turning the water off.

2. The herein described method of growing rice consisting of flooding the rice field with water until the flooded rice has sprouted and rooted, adding a quantity of oil to the water, and adding oil each day during the sprouting and rooting period.

3. The herein described method of growing rice consisting of flooding the rice field with water and oil during the sprouting and rooting period.

4. The herein described method of growing rice consisting of flooding the rice field with water during the sprouting and rooting period and then turning off the water.

5. The herein described method of sprouting rice seed consisting of flooding the rice field with water, applying oil to the surface of the water to destroy insects, turning off the water after the rice seed have sprouted, and again flooding the field before the seed of other vegetation have attained sufficient growth to survive the flooding.

In testimony whereof I affix my signature.

BERT STANSEL.